United States Patent [19]

Neugebauer

[11] 3,857,288
[45] Dec. 31, 1974

[54] MANOMETER WITH SAFETY DEVICE

[75] Inventor: Gerhard Neugebauer, Trennfurt, Germany

[73] Assignee: Alexander Wiegand Armaturen- und Manometerfabrik, Klingenberg, Germany

[22] Filed: Dec. 13, 1972

[21] Appl. No.: 314,745

[30] Foreign Application Priority Data
May 25, 1972  Germany............................ 7219617

[52] U.S. Cl. ................................. 73/416, 220/89 A
[51] Int. Cl. ............................................... G01i 7/04
[58] Field of Search .............................. 137/68–71; 220/89 A; 73/416, 418, 420, 392; 222/3–5

[56] References Cited
UNITED STATES PATENTS
2,522,007   9/1950   Willach............................ 73/416 X
2,552,110   5/1951   Otis et al. ........................ 220/89 A
2,656,950   10/1953  Coffman.......................... 220/89 A
2,915,216   12/1959  Coffman.......................... 220/89 A
3,404,698   10/1968  Rouse .................................. 137/68
3,612,345   10/1971  Fike................................. 220/89 A Primary Examiner—Martin P. Schwadron
Assistant Examiner—Richard Gerard
Attorney, Agent, or Firm—Leonard H. King

[57] ABSTRACT

A safety device for a pressure gauge having a pressure conduit for the application of fluid under pressure to the pressure measuring means of the gauge, a branch conduit leading from said pressure conduit, and a rupturable closure member separating said branch conduit from the external atmosphere. The closure member is designed to rupture when the fluid pressure in the branch conduit exceeds a predetermined level.

7 Claims, 5 Drawing Figures

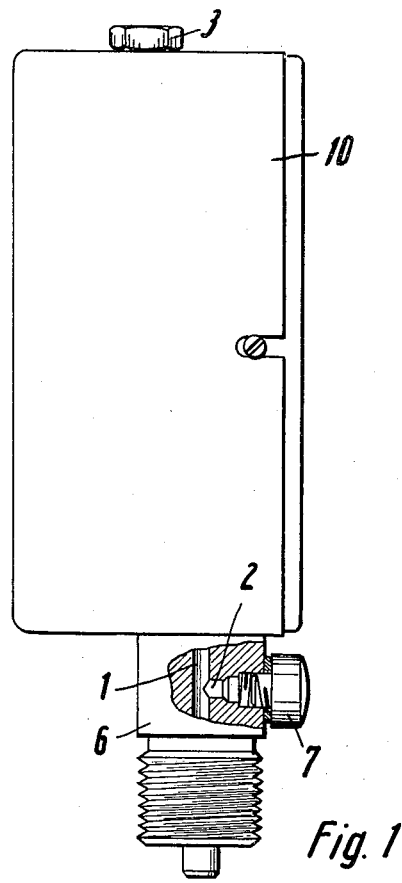
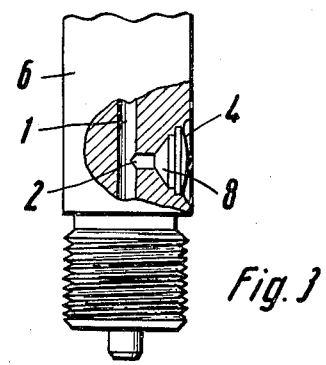
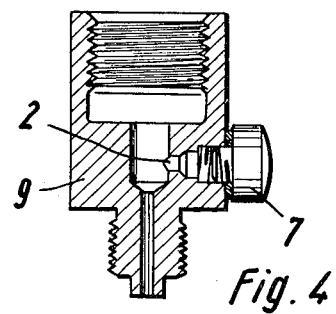
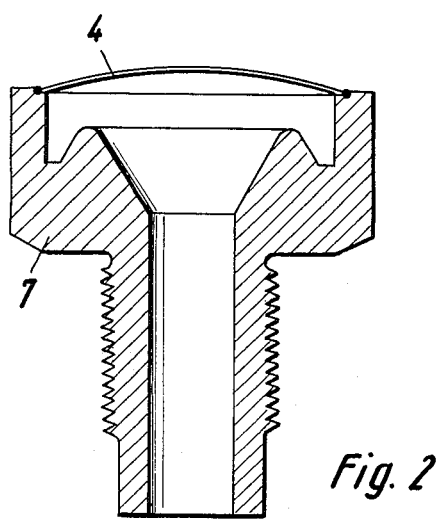
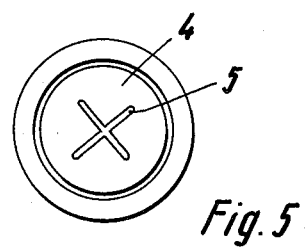

MANOMETER WITH SAFETY DEVICE

FIELD OF THE INVENTION

The invention relates to pressure gauges and in particular means for eliminating potentially harmful excess pressures from such gauges.

BACKGROUND OF THE INVENTION

Pressure gauges are known which incorporate a safety partition resistant to rupture, such partition comprising the base of the casing of the measuring means of the gauge and being located immediately inwardly of the dial so that the pressure gauge is open to the rear. The missing rear wall is replaced by a perforated metal sheet which is covered in a dust-proof manner by a fabric covering or by a foil. The perforated metal sheet and covering are usually connected with the casing by means of a retaining ring.

A relatively thick casing base made of cast iron used to be necessary because hardened steel Bourdon tubes, particularly in the higher pressure operating ranges but also at normal operating pressures, were liable to break with a splintering action. However, this does not apply to the tubes which are used almost exclusively today. They generally become defective as a result of hair-line cracks and any excess pressure which builds up comparatively slowly in the casting is able to escape to the atmosphere via an opening in the aforementioned rear wall of the casting or via a vent valve. A rubber cover is usually employed to seal such an opening and is arranged to open at a casting internal pressure of approximately 0.5 kg/cm$^2$. Fluid-filled pressure gauges are equipped with an excess pressure valve. If, however, during a pressure measurement the Bourdon tube is stressed to bursting pressure and the excess pressure builds up in the casing in a surge-like manner, then it escapes to the rear by tearing the said fabric covering or foil.

To overcome these difficulties it has been proposed to form the rear wall of the pressure gauge casing as a hingedly mounted sheet metal cover which is able to open outwards without flying off. It has furthermore been proposed to engage such a sheet metal cover against the casing in a fluid-tight manner by means of a seal in order to permit the use of fluid filled pressure gauges with a pressure-proof partition. However, if the Bourdon tube bursts, such a cover can be ejected rearwardly with the danger of people being seriously injured. Such ejection of the cover is exacerbated by the fluid filling.

All these previously proposed arrangements are relatively costly and are not satisfactory when a Bourdon tube bursts as a result of excess pressure.

SUMMARY OF THE INVENTION

The present invention provides a pressure gauge having a pressure conduit for the application of fluid under pressure to the pressure measuring means of the gauge, a branch conduit leading from said pressure conduit, and a closure member separating said branch conduit from the external atmosphere, said closure member being arranged to rupture when the fluid pressure in said branch conduit exceeds a predetermined level.

Viewed from another aspect the invention provides a connector device for connecting a pressure gauge to a source of fluid pressure whose level is to be measured, the device comprising a pressure conduit for the application of fluid under pressure to the pressure measuring means of the gauge, a branch conduit leading from said conduit, and a closure member separating said branch conduit from the external atmosphere, said closure member being arranged to rupture when the fluid pressure in said branch conduit exceeds a predetermined level.

Thus the said closure member is connected in series with the Bourdon tube or other pressure measuring means of the pressure gauge so that when an excess pressure surge occurs the closure member ruptures and the excess pressure surge is released to the atmosphere.

The closure member preferably comprises a diaphragm provided with one or more imprints, scribings or regions of reduced thicknesses constituting lines of weakness, such as are for example known for facilitating the opening of cans. The closure member can for example be made of metal, rubber, plastics or other suitable fluid-tight but rupturable material.

Preferably the said closure member is carried by a support secured or securably in the outer end of the said branch conduit. The said support may then be screw-threadedly secured or securable in the outer end of the said branch conduit, or alternatively it may be fixed secured or securable in a transversely enlarged outer end region of the said branch conduit, e.g., by means of welding, soldering, adhesive, retaining rings or the like.

Incorporation of the closure member in a separate connector device as already set forth enables any massproduced, and possibly already installed, pressure gauge to be equipped with a rupturable closure member in accordance with the invention.

Some embodiments of the invention will now be described by way of example and with reference to the accompanying drawings, in which:

FIG. 1 is a view partially in section of a pressure gauge according to the invention;

FIG. 2 is a sectional view, to a larger scale, of the rupturable closure member and its support used in the gauge of FIG. 1;

FIG. 3 is a view partially in section of the relevant part of a modified pressure gauge;

FIG. 4 is a sectional view of a connector device according to the invention; and FIG. 5 is a plan view of a rupturable closure member.

In the drawings 1 is a pressure conduit for the application of fluid under pressure to the pressure measuring means (not shown) located in a pressure gauge casing 10; 2 is a branch conduit leading from the conduit 1; 3 is a vent valve in casing 10; 4 is a rupturable closure member in the form of a metal diaphragm formed with imprints 5; 6 is the part of the pressure gauge which is connectible to a source of pressure fluid, 8 is an enlarged outer end region of branch conduit for the direct mounting of a support for a closure member 4.

FIG. 4 shows a separate connector device for the connection of a pressure gauge to a source of pressurized fluid and incorporating a pressure conduit and a branch conduit 2 screw-threadedly mounting the support of a rupturable closure member. Naturally, connector device 9 can also be constructed as shown in FIG. 3; i.e., with a directly mounted support for a closure member 4.

The imprints 5 of FIG. 5 can be replaced by scribings on the material or by thinner portions of the material, all such as to form lines of weakness.

If, in operation, the pressure in the pressure gauge is continually and rapidly increased from zero (gauge) to 6 kg/cm² for example, then the pressure in the Bourdon tube corresponds to the pressure on the rupturable closure member 4. If the wall thickness of the Bourdon tube, of Aisi 316Ti material having an O.D. of 100 mm and rated to burst at a pressure of 6 kg/cm², is 0.45 mm, then the thickness of the closure member (if its diameter is correctly dimensioned) should be only one-fourth of 0.45. The closure member will then rupture at one-fourth of the bursting pressure of the Bourdon tube. By increasing the closure member diameter the rupturing pressure can be reduced as desired. The required diameter may be experimentally determined. Additional rated rupturing points can be provided in the closure member so that it remains at its point of installation.

As the closure member is advantageously made from the same material as the Bourdon tube, it is subject to corrosion caused by corrosive media in the same way as the Bourdon tube, but due to the lesser wall thickness of the closure member destruction thereof occurs earlier than with the tube. Theoretically a closure member must be kept in store for each pressure level but in practive several pressure ranges can be combined.

I claim:

1. A pressure gauge and safety device in combination comprising:
   a. a pressure gauge having a rupturable pressure measuring means;
   b. a connector adapter to be coupled to said pressure gauge, said connector including a pressure conduit arranged to apply fluid under pressure to said pressure measuring means of said pressure gauge;
   c. a branch conduit leading from said pressure conduit;
   d. a closure member defined by a diaphragm having at least one line of weakness extending in a direction over the surface thereof for separating said branch conduit from the external atmosphere, said closure member being arranged to rupture before said pressure measuring means ruptures when the fluid pressure in said branch conduit exceeds a predetermined level, the material of said closure member being the same as that of the pressure measuring means in the pressure gauge whereby said closure member is subjected to corrosion at the same rate as the pressure measuring means; and
   e. a support secured in the outer end of said branch conduit for carrying said diaphragm whereby when said diaphragm ruptured all of said diaphragm will be retained in said support while providing fluid communication between said pressure conduit, said branch conduit and the external atmosphere.--

2. The apparatus of claim 1 wherein said support is screw-threadidly securable in the outer end of said branch conduit.

3. The apparatus of claim 2 wherein said support is fixably secured in a transversely enlarged outer end region of said branch conduit.

4. The apparatus of claim 1 wherein the thickness of said closure member is less than the wall thickness of the pressure measuring means.

5. The apparatus of claim 4 wherein the thickness of said closure member is approximately one-fourth the wall thickness of the pressure measuring means.

6. The apparatus of claim 1 wherein said line of weakness extends only partially over the surface of said closure member.

7. The apparatus of claim 1 wherein there are two lines of weakness in the form of an X.

* * * * *